(12) United States Patent
Hanson

(10) Patent No.: US 12,152,831 B2
(45) Date of Patent: Nov. 26, 2024

(54) CRISPER ASSEMBLY WITH SLIDE OUT SHELF

(71) Applicant: Electrolux Home Products, Inc., Charlotte, NC (US)

(72) Inventor: Joshua Hanson, Huntersville, NC (US)

(73) Assignee: Electrolux Home Products, Inc., Charlotte, NC (US)

( * ) Notice: Subject to any disclaimer, the term of this patent is extended or adjusted under 35 U.S.C. 154(b) by 721 days.

(21) Appl. No.: 17/223,472

(22) Filed: Apr. 6, 2021

(65) Prior Publication Data

US 2022/0316793 A1  Oct. 6, 2022

(51) Int. Cl.
| | |
|---|---|
| F25D 25/02 | (2006.01) |
| A23B 7/159 | (2006.01) |
| B01D 53/04 | (2006.01) |
| B01D 53/22 | (2006.01) |
| B01D 53/26 | (2006.01) |
| F25D 17/04 | (2006.01) |

(52) U.S. Cl.
CPC ............ *F25D 25/025* (2013.01); *A23B 7/159* (2013.01); *B01D 53/0415* (2013.01); *B01D 53/229* (2013.01); *B01D 53/268* (2013.01); *F25D 17/042* (2013.01); *A23V 2002/00* (2013.01); *B01D 2257/7022* (2013.01); *B01D 2257/80* (2013.01); *F25D 2317/041* (2013.01); *F25D 2325/00* (2013.01)

(58) Field of Classification Search
CPC .... F25D 17/042; F25D 25/025; F25D 25/024; F25D 23/067; B01D 53/0415; B01D 53/268; A23B 7/159
See application file for complete search history.

(56) References Cited

U.S. PATENT DOCUMENTS

| | | | |
|---|---|---|---|
| 4,934,541 A | | 6/1990 | Bussan et al. |
| 5,641,217 A | * | 6/1997 | Caruso .................. F25D 25/025 |
| | | | 312/334.23 |
| 5,775,789 A | * | 7/1998 | Rainey .................. F25D 25/024 |
| | | | 108/107 |
| 5,918,480 A | * | 7/1999 | Nagata .................. F25D 17/042 |
| | | | 215/310 |
| 6,565,169 B1 | | 5/2003 | Moreno-Olguin et al. |
| 6,675,603 B1 | | 1/2004 | Lesyna et al. |

(Continued)

FOREIGN PATENT DOCUMENTS

| | | |
|---|---|---|
| CN | 106322909 | 8/2019 |
| DE | 69524370 | 8/2002 |

(Continued)

OTHER PUBLICATIONS

International Search Report for PCT/US2022/020757, dated Jun. 28, 2022, 3 pages.

*Primary Examiner* — Frantz F Jules
*Assistant Examiner* — Martha Tadesse
(74) *Attorney, Agent, or Firm* — Pearne & Gordon LLP

(57) ABSTRACT

A refrigerator appliance includes a storage compartment having a crisper assembly disposed therein. The crisper assembly includes a drawer, a lid, and a shelf. The lid is fixed to the storage compartment and remains stationary therewith. The drawer and the shelf are each configured to be extended or retracted relative to the storage compartment and are provided in a stacked arrangement. The lid seals the drawer when the drawer is in the retracted position.

20 Claims, 11 Drawing Sheets

(56) References Cited

U.S. PATENT DOCUMENTS

| | | |
|---|---|---|
| 7,914,094 B2 | 3/2011 | Wood |
| 8,226,182 B2 | 7/2012 | Park et al. |
| 8,317,280 B2 | 11/2012 | Wood |
| 8,328,302 B2 | 12/2012 | Kim et al. |
| 8,403,437 B2 | 3/2013 | Bergmann et al. |
| 8,517,483 B2 | 8/2013 | Eubanks et al. |
| 8,590,334 B2 | 11/2013 | Kim et al. |
| 8,814,285 B2 | 8/2014 | Park et al. |
| 8,915,561 B2 | 12/2014 | Eichman et al. |
| 9,062,910 B2 | 6/2015 | Kim et al. |
| 9,140,483 B2 | 9/2015 | Park et al. |
| 9,435,580 B2 | 9/2016 | Dubina et al. |
| 9,480,267 B2 | 11/2016 | Arrigo |
| 9,488,405 B2 | 11/2016 | Lee et al. |
| 9,677,806 B2 | 6/2017 | Bischofberger et al. |
| 9,693,626 B2 | 7/2017 | Zimmermann |
| 9,845,984 B2 | 12/2017 | Gunduz et al. |
| 9,851,138 B2 | 12/2017 | Laible |
| 9,903,643 B2 | 2/2018 | Dubina et al. |
| 10,085,558 B2 | 10/2018 | Klaus |
| 10,234,193 B2 | 3/2019 | Gunduz et al. |
| 10,386,114 B2 | 8/2019 | Fink et al. |
| 10,415,875 B2 | 9/2019 | Biotti et al. |
| 10,502,480 B2 | 12/2019 | Dominguez et al. |
| 10,591,203 B2 | 3/2020 | Kang et al. |
| 11,555,648 B2 | 1/2023 | Voltarelli et al. |
| 2014/0117831 A1* | 5/2014 | Lee ............... F25D 25/025 312/408 |
| 2014/0265807 A1 | 9/2014 | Kendall et al. |
| 2017/0276425 A1 | 9/2017 | Fink et al. |
| 2019/0293342 A1 | 9/2019 | Butenhof et al. |
| 2020/0056826 A1 | 2/2020 | Cizik et al. |

FOREIGN PATENT DOCUMENTS

| | | | |
|---|---|---|---|
| DE | 102013225541 | 6/2015 | |
| DE | 102013225541 A1 * | 6/2015 | ........... F25D 25/025 |
| EP | 2938949 | 11/2015 | |
| JP | 2015105757 A * | 6/2015 | ........... F25D 25/025 |

* cited by examiner

CRISPER ASSEMBLY WITH SLIDE OUT SHELF

FIELD OF THE INVENTION

This application relates generally to a refrigerator appliance including a crisper assembly, and more particularly, to a refrigerator appliance including a crisper assembly having a sealable drawer and a slide out shelf provided in a stacked arrangement.

BACKGROUND OF THE INVENTION

Conventional refrigeration appliances, such as domestic refrigerators, typically have both a fresh food compartment and a freezer compartment or section. The fresh food compartment is where food items such as fruits, vegetables, and beverages are stored and the freezer compartment is where food items that are to be kept in a frozen condition are stored. The refrigerators are provided with a refrigeration system that maintains the fresh food compartment at temperatures above 0° C., such as between 0.25° C. and 4.5° C. and the freezer compartments at temperatures below 0° C., such as between 0° C. and −20° C.

The arrangements of the fresh food and freezer compartments with respect to one another in such refrigerators vary. For example, in some cases, the freezer compartment is located above the fresh food compartment and in other cases the freezer compartment is located below the fresh food compartment. Additionally, many modern refrigerators have their freezer compartments and fresh food compartments arranged in a side-by-side relationship. Whatever arrangement of the freezer compartment and the fresh food compartment is employed, typically, separate access doors are provided for the compartments so that either compartment may be accessed without exposing the other compartment to the ambient air.

Conventional refrigerator appliances also generally include one or more crisper assemblies for storing produce (e.g., lettuce, fruits, fresh herbs, etc.) in a humidity-controlled environment that is isolated from the main storage compartment. Such crisper assemblies generally include a crisper drawer with a cover or lid that performs a function for inhibiting or preventing dry air in the main storage compartment from entering the drawer. In some crisper assemblies, the lid also serves as a shelf storage space. In many refrigerator appliances, the lid is fixed to the storage compartment and cannot move relative to the crisper drawer. This type of arrangement can be ergonomically unsuitable for a user. Therefore, it is beneficial to have a refrigerator storage compartment with a crisper assembly that includes a slide out shelf disposed directly above a sealable drawer and in a stacked arrangement therewith for improving the ergonomic design and space utilization of the storage compartment.

BRIEF SUMMARY OF THE INVENTION

The following presents a simplified summary of the disclosure in order to provide a basic understanding of some example aspects described in the detailed description. This summary is not an extensive overview. Moreover, this summary is not intended to identify critical elements of the disclosure nor delineate the scope of the disclosure. The sole purpose of the summary is to present some concepts in simplified form as a prelude to the more detailed description that is presented later.

In accordance with one aspect, there is provided a refrigerator including a storage compartment and a drawer slidably mounted to the storage compartment and configured to slide between an extended position and a retracted position. The refrigerator also includes a shelf positioned above the drawer and in a stacked arrangement therewith. The shelf is slidably mounted to the storage compartment independently of the drawer and is configured to slide between an extended position and a retracted position independently of the drawer. The refrigerator additionally includes a lid interposed between the drawer and the shelf. The lid is fixed to the storage compartment such that the lid remains stationary therewith. The lid is configured to cover the drawer when the drawer is in the retracted position in the storage compartment.

In accordance with yet another aspect, there is provided a crisper assembly for a refrigerator storage compartment including a drawer that is configured to slide between an extended position and a retracted position. The crisper assembly also includes a shelf positioned above the drawer and in a stacked arrangement therewith. The shelf is independent of the drawer and is configured to slide between an extended position and a retracted position. The crisper assembly additionally includes a lid interposed between the drawer and the shelf. The lid is fixed relative to both of the drawer and the shelf and is configured to cover the drawer when the drawer is in the retracted position.

It is to be understood that both the foregoing general description and the following detailed description present embodiments of the present disclosure, and are intended to provide an overview or framework for understanding the nature and character of the embodiments as they are described and claimed. The accompanying drawings are included to provide a further understanding of the embodiments, and are incorporated into and constitute a part of this specification. The drawings illustrate various embodiments of the disclosure and together with the description serve to explain the principles and operations thereof.

BRIEF DESCRIPTION OF THE DRAWINGS

These and other features, aspects and advantages of the present disclosure can be further understood when read with reference to the accompanying drawings.

DESCRIPTION OF EXAMPLE EMBODIMENTS

Figure 1:
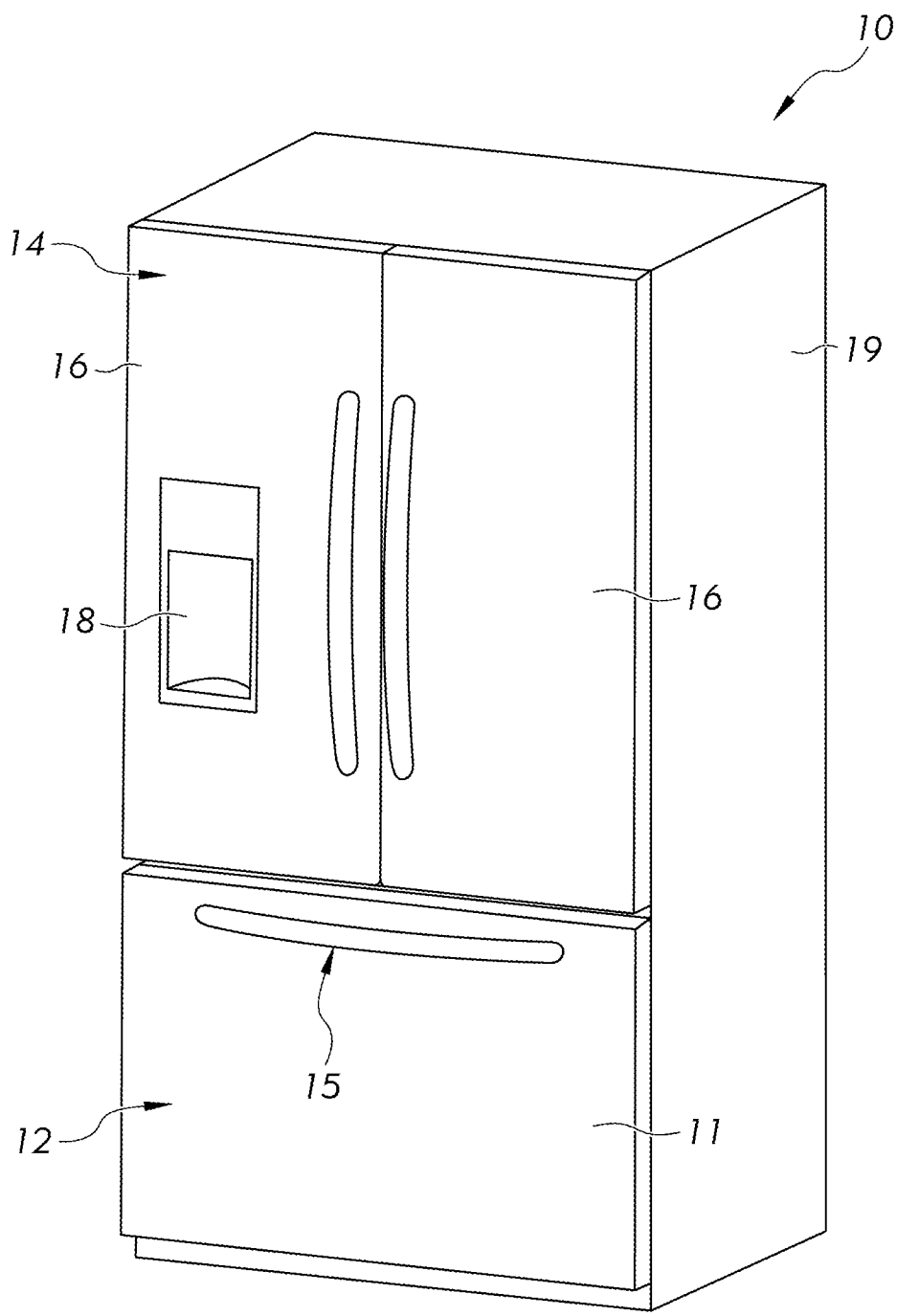
FIG. 1 is a front perspective view of a household French Door Bottom Mount refrigerator wherein doors of the refrigerator are in a closed position.

Apparatus will now be described more fully hereinafter with reference to the accompanying drawings in which embodiments of the disclosure are shown. Whenever possible, the same reference numerals are used throughout the drawings to refer to the same or like parts. However, this disclosure may be embodied in many different forms and should not be construed as limited to the embodiments set forth herein.

Referring now to the drawings, FIG. 1 shows a refrigeration appliance in the form of a domestic refrigerator, indicated generally at 10. Although the detailed description that follows concerns a domestic refrigerator 10, the invention can be embodied by refrigeration appliances other than with a domestic refrigerator 10. Further, an embodiment is described in detail below, and shown in the figures as a bottom-mount configuration of a refrigerator 10, including a fresh food storage compartment 14 disposed vertically above a freezer storage compartment 12. However, the refrigerator 10 can have any desired configuration including at least one of a fresh food storage compartment 14 and/or a freezer storage compartment 12, such as a top mount refrigerator (freezer disposed above the fresh food compartment), a side-by-side refrigerator (fresh food compartment is laterally next to the freezer compartment), a standalone refrigerator or freezer having a single main compartment, etc.

Figure 2:
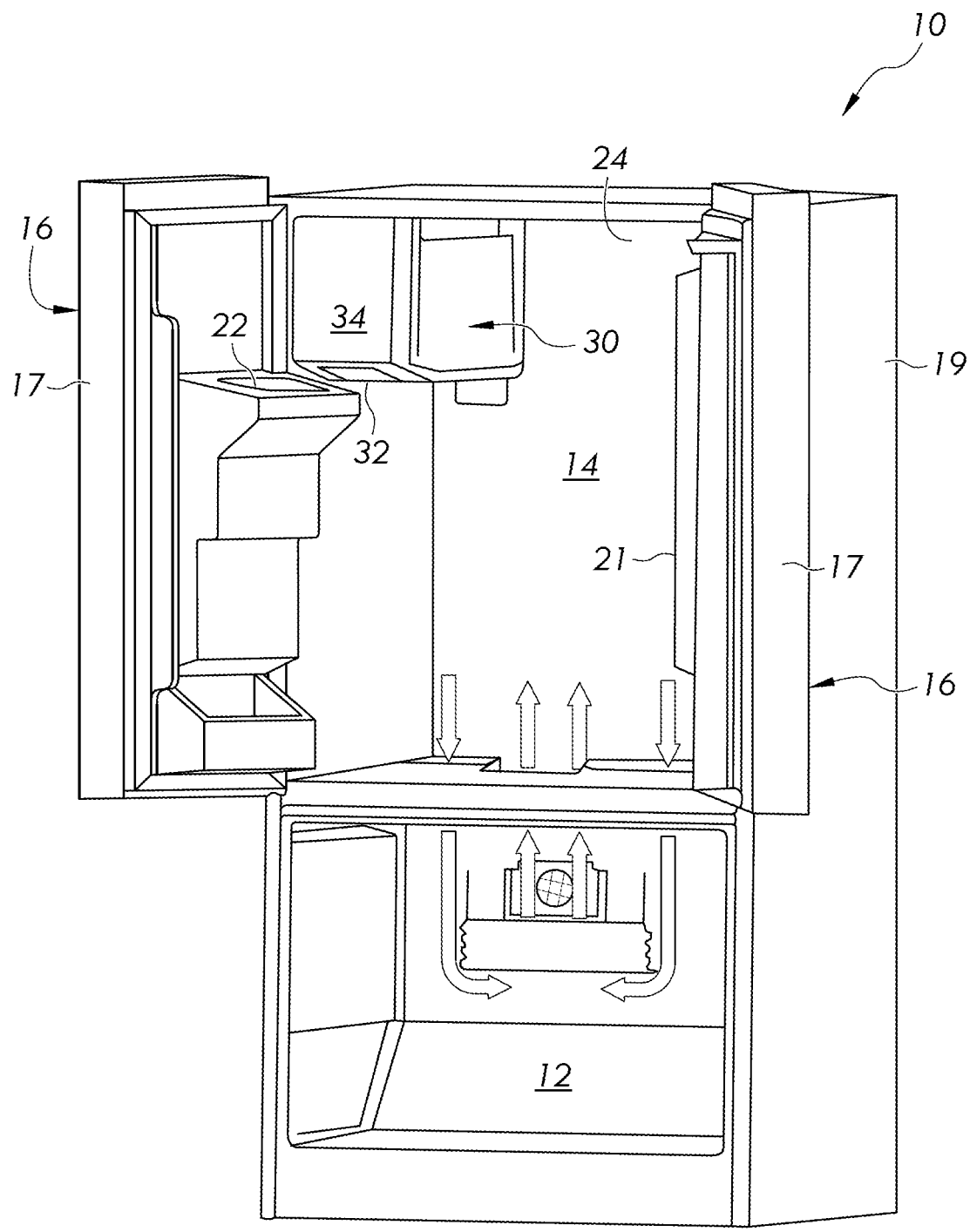
FIG. 2 is a front perspective view of the refrigerator of FIG. 1 showing the doors in an opened position and an interior of a fresh food compartment.

One or more doors 16 shown in FIG. 1 are pivotally coupled to a cabinet 19 of the refrigerator 10 to restrict and grant access to the fresh food storage compartment 14. The door 16 can include a single door that spans the entire lateral distance across the entrance to the fresh food storage compartment 14, or can include a pair of French-type doors 16 as shown in FIG. 1 that collectively span the entire lateral distance of the entrance to the fresh food storage compartment 14 to enclose the fresh food storage compartment 14. For the latter configuration, a center flip mullion 21 (FIG. 2) is pivotally coupled to at least one of the doors 16 to establish a surface against which a seal provided to the other one of the doors 16 can seal the entrance to the fresh food storage compartment 14 at a location between opposing side surfaces 17 (FIG. 2) of the doors 16. The mullion 21 can be pivotally coupled to the door 16 to pivot between a first orientation that is substantially parallel to a planar surface of the door 16 when the door 16 is closed, and a different orientation when the door 16 is opened. The externally-exposed surface of the center mullion 21 is substantially parallel to the door 16 when the center mullion 21 is in the first orientation, and forms an angle other than parallel relative to the door 16 when the center mullion 21 is in the second orientation. The seal and the externally-exposed surface of the mullion 21 cooperate approximately midway between the lateral sides of the fresh food storage compartment 14.

A dispenser 18 (FIG. 1) for dispensing at least ice pieces, and optionally water, can be provided on an exterior of one of the doors 16 that restricts access to the fresh food storage compartment 14. The dispenser 18 includes an actuator (e.g., lever, switch, proximity sensor, etc.) to cause frozen ice pieces to be dispensed from an ice bin 34 (FIG. 2) of an ice maker 30 disposed within the fresh food storage compartment 14. Ice pieces from the ice bin 34 can exit the ice bin 34 through an aperture 32 and be delivered to the dispenser 18 via an ice chute 22 (FIG. 2), which extends at least partially through the door 16 between the dispenser 18 and the ice bin 34.

Referring to FIG. 1, the freezer storage compartment 12 is arranged vertically beneath the fresh food storage compartment 14. A drawer assembly (not shown) including one or more freezer baskets (not shown) can be withdrawn from the freezer storage compartment 12 to grant a user access to food items stored in the freezer storage compartment 12. The drawer assembly can be coupled to a freezer door 11 that includes a handle 15. When a user grasps the handle 15 and pulls the freezer door 11 open, at least one or more of the freezer baskets is caused to be at least partially withdrawn from the freezer storage compartment 12.

In alternative embodiments, the ice maker is located within the freezer compartment. In this configuration, although still disposed within the freezer compartment, at least the ice maker (and possible an ice bin) is mounted to an interior surface of the freezer door. It is contemplated that the ice mold and ice bin can be separate elements, in which one remains within the freezer compartment and the other is on the freezer door.

The freezer storage compartment 12 is used to freeze and/or maintain articles of food stored in the freezer storage compartment 12 in a frozen condition. For this purpose, the freezer storage compartment 12 is in thermal communication with a freezer evaporator (not shown) that removes thermal energy from the freezer storage compartment 12 to maintain the temperature therein at a temperature of 0° C. or less during operation of the refrigerator 10, preferably between 0° C. and −50° C., more preferably between 0° C. and −30° C. and even more preferably between 0° C. and −20° C.

The refrigerator 10 includes an interior liner 24 (FIG. 2) that defines the fresh food storage compartment 14. The fresh food storage compartment 14 is located in the upper portion of the refrigerator 10 in this example and serves to minimize spoiling of articles of food stored therein. The fresh food storage compartment 14 accomplishes this by maintaining the temperature in the fresh food storage compartment 14 at a cool temperature that is typically above 0° C., so as not to freeze the articles of food in the fresh food storage compartment 14. It is contemplated that the cool temperature preferably is between 0° C. and 10° C., more preferably between 0° C. and 5° C. and even more preferably between 0.25° C. and 4.5° C. According to some embodiments, cool air from which thermal energy has been removed by the freezer evaporator can also be blown into the fresh food storage compartment 14 to maintain the temperature therein greater than 0° C. preferably between 0° C. and 10° C., more preferably between 0° C. and 5° C. and even more preferably between 0.25° C. and 4.5° C. For alternate embodiments, a separate fresh food evaporator can optionally be dedicated to separately maintaining the temperature within the fresh food storage compartment 14 independent of the freezer storage compartment 12. According to an embodiment, the temperature in the fresh food storage compartment 14 can be maintained at a cool temperature within a close tolerance of a range between 0° C. and 4.5° C., including any subranges and any individual temperatures falling with that range. For example, other embodiments can optionally maintain the cool temperature within the fresh food storage compartment 14 within a reasonably close tolerance of a temperature between 0.25° C. and 4° C.

Figure 3:
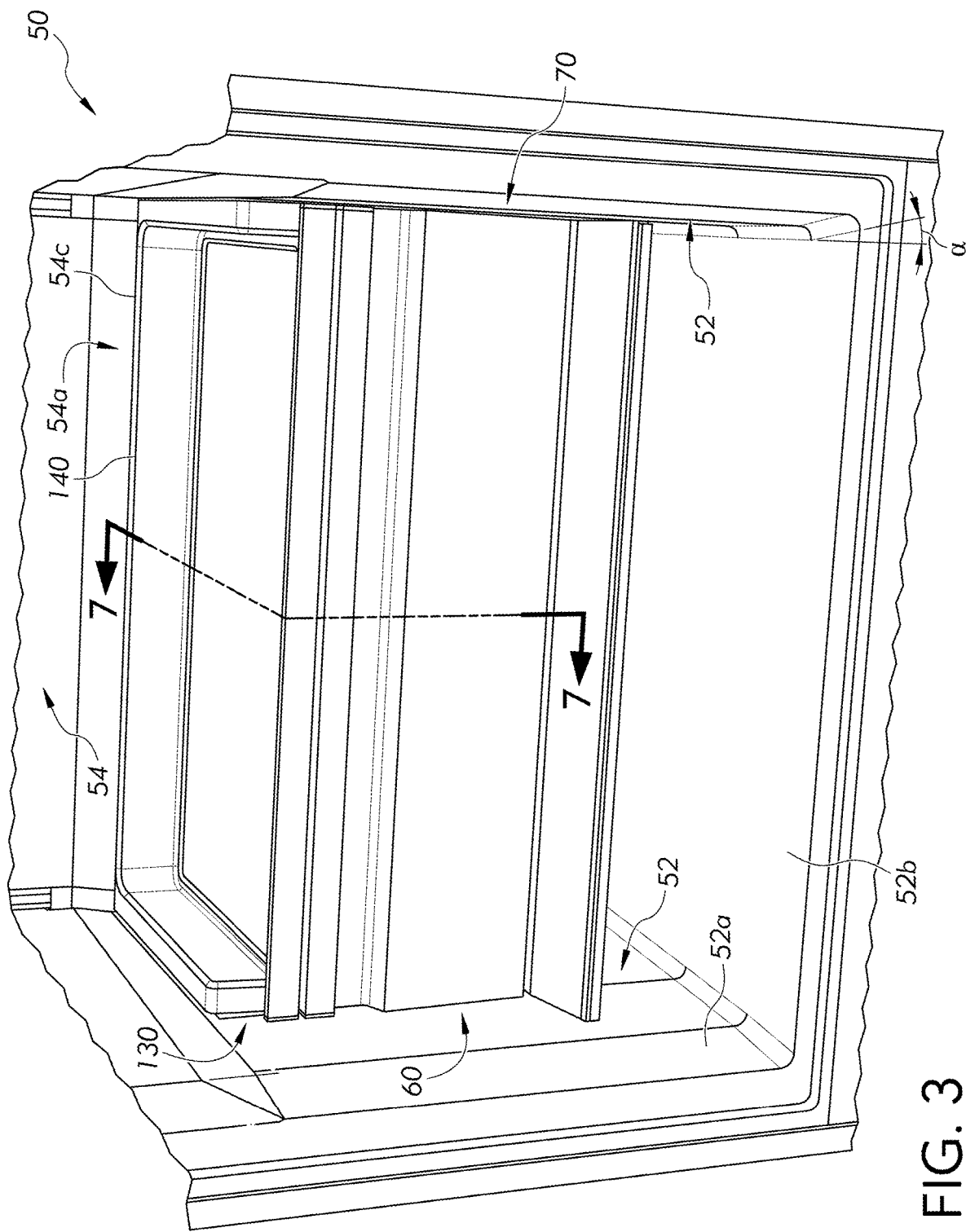
FIG. 3 is an enlarged perspective view of a fresh food storage compartment according to another embodiment including an example crisper assembly as disclosed herein.

Turning now to FIG. 3, a storage compartment 50 according to another embodiment is shown with a crisper assembly 60 provided therein. In general, the storage compartment 50 and crisper assembly 60 described herein provide a more ergonomic and space-saving design for a user, as described in detail below. As shown in FIG. 3, the crisper assembly 60 includes a crisper drawer 70, a crisper lid 100 (FIG. 7), and a slide out shelf 130 disposed directly above the drawer 70 and in a stacked arrangement therewith. In the illustrated example, the crisper lid 100 (FIG. 5) is eclipsed by (i.e., hidden behind) a handle 84 of the crisper drawer 70.

For the purposes of this disclosure, a "stacked arrangement" should be understood to mean a relationship wherein at least two components are positioned directly adjacent to one another. Preferably, there is little to no gap formed therebetween when viewing the components from a front of the storage compartment 50, e.g., looking into the storage compartment 50. However, there could also be some overlap between the stacked components.

Figure 4:
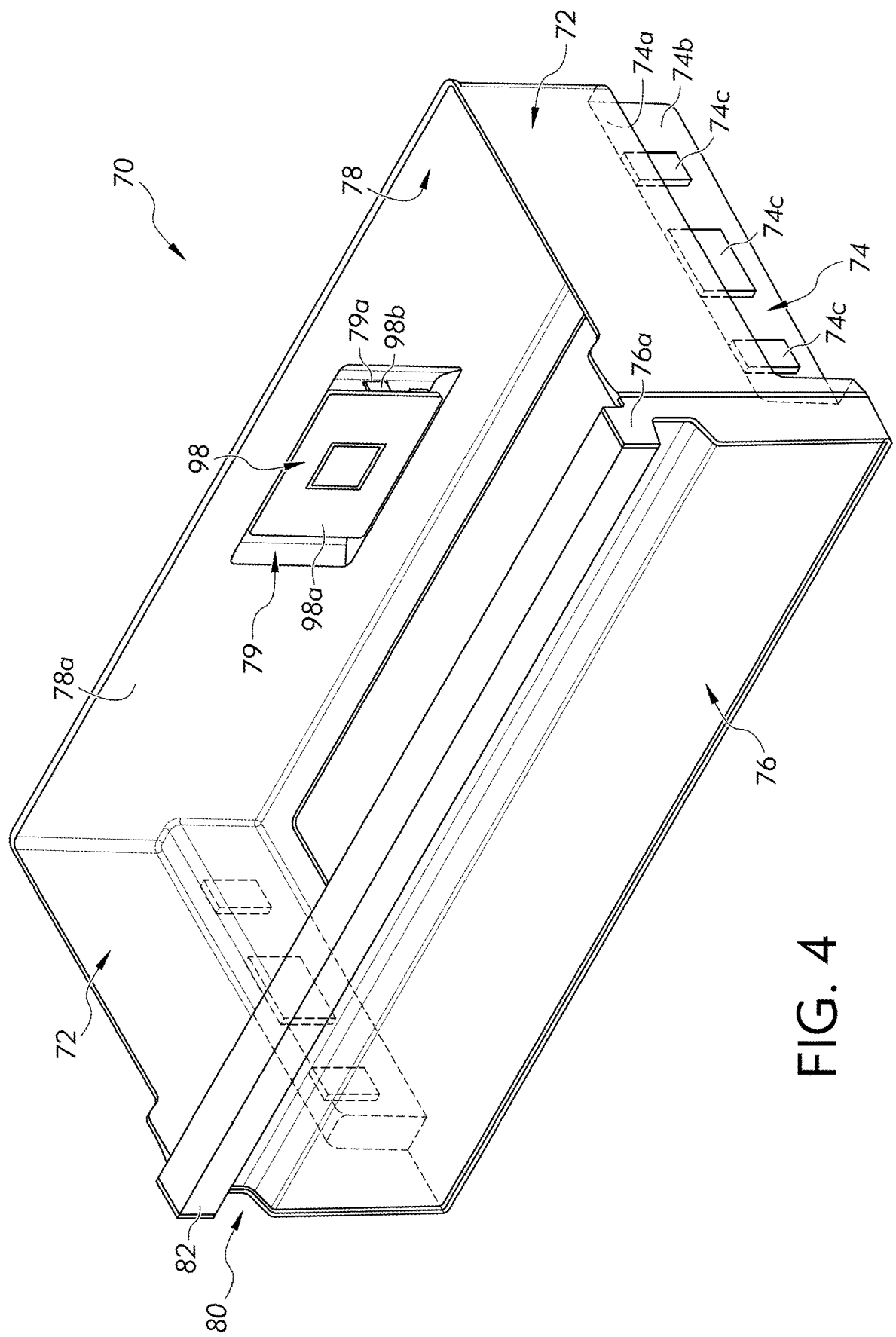
FIG. 4 is a front perspective view of a crisper drawer of the crisper assembly of FIG. 3.

Referring to FIG. 4, an example of the crisper drawer 70 is shown in isolation. The crisper drawer 70 is preferably made of a plastic material of suitable strength (e.g., ABS, polypropylene, polystyrene, and the like). In the illustrated embodiment, the crisper drawer 70 is presented as being made of a transparent plastic material. In alternative embodiments, the crisper drawer 70 may comprise an opaque, tinted, or translucent plastic material. The crisper drawer 70 includes opposing side walls 72 spaced apart and connected by a front wall 76 and a rear wall 78. A recess 74 is formed into an exterior portion of each side wall 72. Each recess 74 is shaped and dimensioned to accommodate an extendable slide 90 (FIG. 9), as described in detail below, that supports the crisper drawer 70 within the cooled compartment. In the illustrated example, each recess 74 is substantially rectangular-shaped and generally defined by an overhang portion 74a and a vertical wall 74b. A plurality of protrusions 74c are formed depending from the vertical wall 74b, for example at a junction of the overhang portion 74a and the vertical wall 74b, and extend downwardly into each recess 74. In the illustrated embodiment, there are three protrusions 74c formed in each recess 74. However, it is contemplated that the protrusions 74c may be different in number and form, e.g., may embody a single, elongated protrusion. Functionally, the protrusions 74c are sized and positioned to be received by slots 90c (FIG. 9) formed into an upper surface of a corresponding extension slide 90 (FIG. 9) for removably mounting the drawer 70 to the storage compartment 50, as described in detail below.

Still referring to FIG. 4, a substantially rectangular-shaped pocket 80 may be formed in an upper portion of the front wall 76 and extend longitudinally along an entire length thereof. In some examples, it is contemplated that the pocket 80 may be different in shape, e.g., semi-circular shaped contour, etc. Yet, in other examples, it is contemplated that the pocket 80 may extend along only a portion of the front wall 76. In the shown example, an upper end 76a of the front wall 76 may include a front trim member 82 attached thereto. In some examples, an alumina facia (not shown) may be attached to a front surface of the front trim member 82 to improve the overall aesthetic appearance of the crisper drawer 70.

Figure 7A:
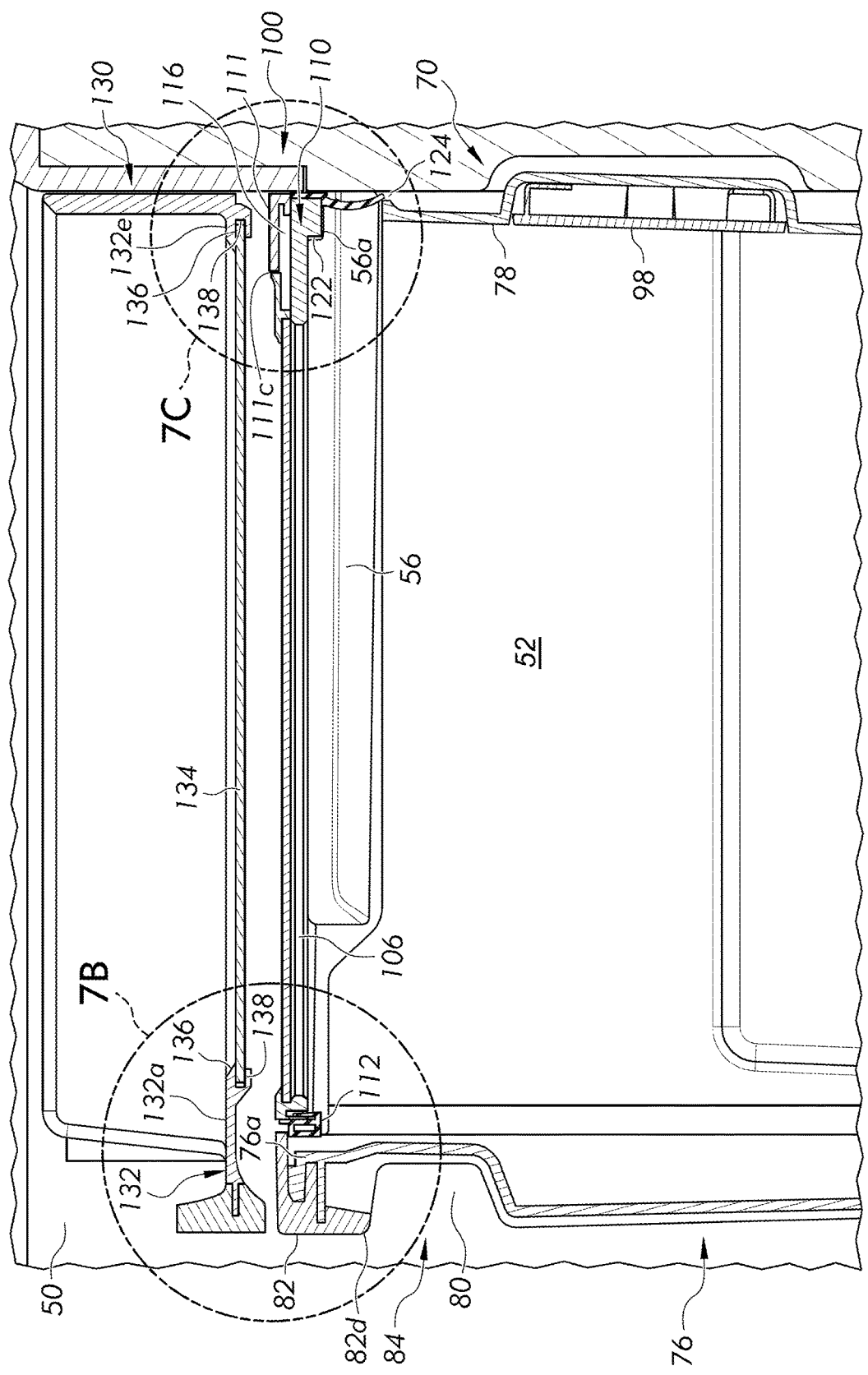
FIG. 7A is a cross-section view of the crisper assembly taken along line 7-7 of FIG. 3.

Turning now to FIG. 7A, a sectional view of the crisper assembly 60 is shown with the front trim member 82 attached to the front wall 76 of the crisper drawer 70. In the illustrated embodiment, the front trim member 82 comprises a substantially L-shaped body that wraps around the upper end 76a of the front wall 76. As shown in FIG. 7B, the front trim member 82 includes a horizontal protrusion 82c extending from a rear surface thereof that is sized and dimensioned to be received by a mating groove 76b formed in the upper end 76a of the front wall 76. It is contemplated that the protrusion 82c and the mating groove 76b may be sized and dimensioned such that the protrusion 82c may be inserted into the mating groove 76b in a snug fit manner for securing the front trim member 82 to the front wall 76. Referring back to FIG. 7A, a distal end 82d of the front trim member 82 and the pocket 80 collectively define a recessed handle 84 for enabling a user to extend or retract the crisper drawer 70 from or into the storage compartment 50, respectively.

Turning back to FIG. 4, optionally, a substantially rectangular-shaped depression 79 may be formed in the rear wall 78 of the drawer 70. In particular, the depression 79 is adapted to removably receive and retain at least one filter cartridge 98 for treating the environment inside the crisper compartment. In various non-limiting examples, the cartridge could include any or all of an ethylene absorber cartridge; an air filter cartridge; a deodorizer cartridge; an antioxidant cartridge; a humidity control cartridge; etc. In other examples, it is contemplated that the depression 79 may be formed in another wall of the drawer 70 for retaining the cartridge 98 thereto, e.g., a front wall, a side wall, etc. In some examples, the cartridge 98 may include snaps 98b formed on a rear surface thereof that are configured to engage openings 79a formed in the rear wall 78 of the drawer 70 for securing the cartridge 98 thereto.

In the illustrated example, the depression 79 is sized and dimensioned to receive the cartridge 98 such that a front surface 98a of the cartridge 98 is substantially flush with a front surface 78a of the rear wall 78. When secured to the rear wall 78 as shown, the cartridge 98 is positioned to treat the air of the environment inside the crisper compartment. In one example, the cartridge 98 is configured to absorb ethylene gas emitted from fruits or vegetables (not shown) placed in the drawer 70, as described in detail below.

Figure 5:
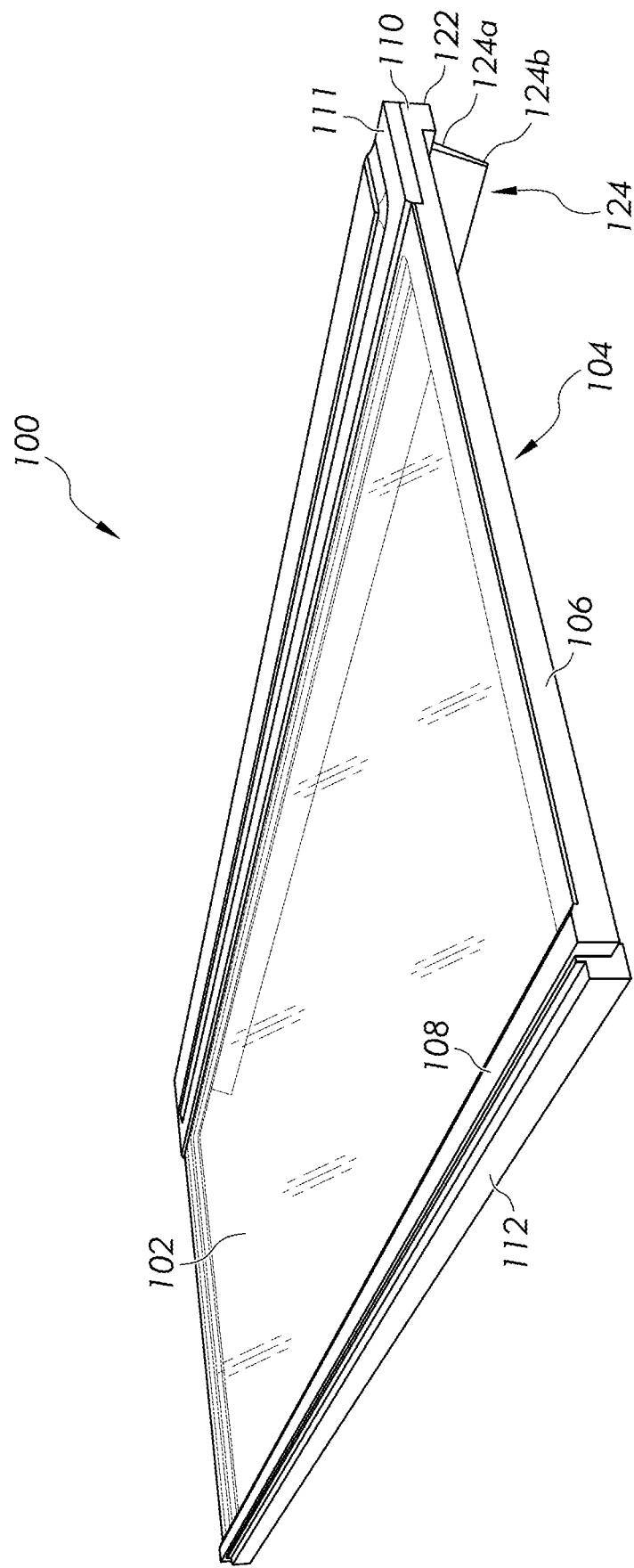
FIG. 5 is a front perspective view of a crisper lid of the crisper assembly of FIG. 3.

Referring to FIG. 5, an example of the crisper lid 100 is shown in isolation. In general, the lid 100 comprises a substantially planar panel 102 that is supported by a frame 104. In some examples, the panel 102 may be a glass panel, although other rigid materials are also contemplated, such as plastic. Preferably, the panel is transparent so that the user can see downwardly into the crisper compartment, and more preferably downwardly into the entire extent of the crisper compartment. However, it is also contemplated that the panel 102 may be partially or completely made of an opaque, tinted, or translucent material. In the illustrated embodiment, the frame 104 embodies a unitary structure comprising opposing side members 106 that are connected by a front trim member 108 and a rear trim member 110. Alternatively, it is contemplated that the respective members 106, 108, and 110 may be formed separately and coupled together utilizing fasteners (e.g., snaps, clips, screws, nuts, bolts, etc.) to assemble the frame 104. Moreover, the frame 104 is preferably made from a plastic material of suitable strength (e.g., ABS, polypropylene, polystyrene, and the like).

The front trim member 108 comprises an elongated body that serves to retain a front longitudinal edge (not shown) of the panel 102. As shown in FIG. 7B, a horizontal groove 108e is formed into a rear portion of the front trim member 108 and is configured to retain the front edge 102a of the panel 102. A front gasket 112 may be attached to the front trim member 108 for sealing the crisper drawer 70, as described in greater detail below. In some examples, the front trim member 108 may include a vertical groove 114 formed into a lower surface thereof that is dimensioned to frictionally receive a finger 112b extending from a rear side of the front gasket 112 for securing the front gasket 112 to the front trim member 108. In some examples, it is contemplated that the front gasket 112 may comprise a resilient, high friction material (e.g., rubber or silicone) that enhances the gripping function of the finger 112b when it is received by the groove 114.

Still referring to FIG. 7B, the front gasket 112 also includes an outer, abutment portion 112a that is configured to engage a rear side of the front trim member 82 when the crisper drawer 70 is in a fully retracted state for sealing a front side of the crisper drawer 70, as described in detail below. In addition or alternatively, it is contemplated that the lid 100 and the front gasket 112 may be sized and dimensioned such that abutment portion 112a engages a rear side of the front wall 76 of the crisper drawer 70 when the crisper drawer 70 is in a fully retracted state. As shown in FIG. 7B, for clarity purposes there is illustrated a small gap between the front gasket 112, the front trim member 82, and the rear side of the front wall 76 of the crisper drawer 70. However, when the crisper drawer 70 is in the normally closed condition, the front gasket 112 would abut either or both of the front trim member 82 and/or front wall 76 of the crisper drawer 70, preferably along substantially the entire length thereof.

Referring back to FIG. 5, the rear trim member 110 of the lid 100 embodies an elongated body that is configured to support a rear longitudinal edge (not shown) of the panel 102 thereon. In the shown example, a removable cover 111 is positioned on the rear trim member 110 of the lid 100.

Figure 7C:
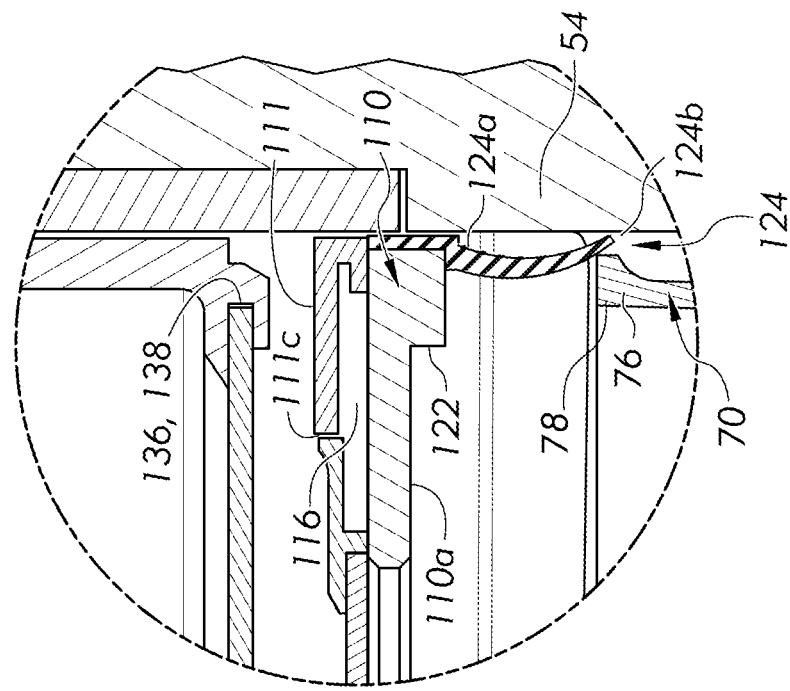
FIG. 7C is a closeup cross-section view of a rear portion of the crisper assembly taken along line 7-7 of FIG. 3.
Figure 7B:
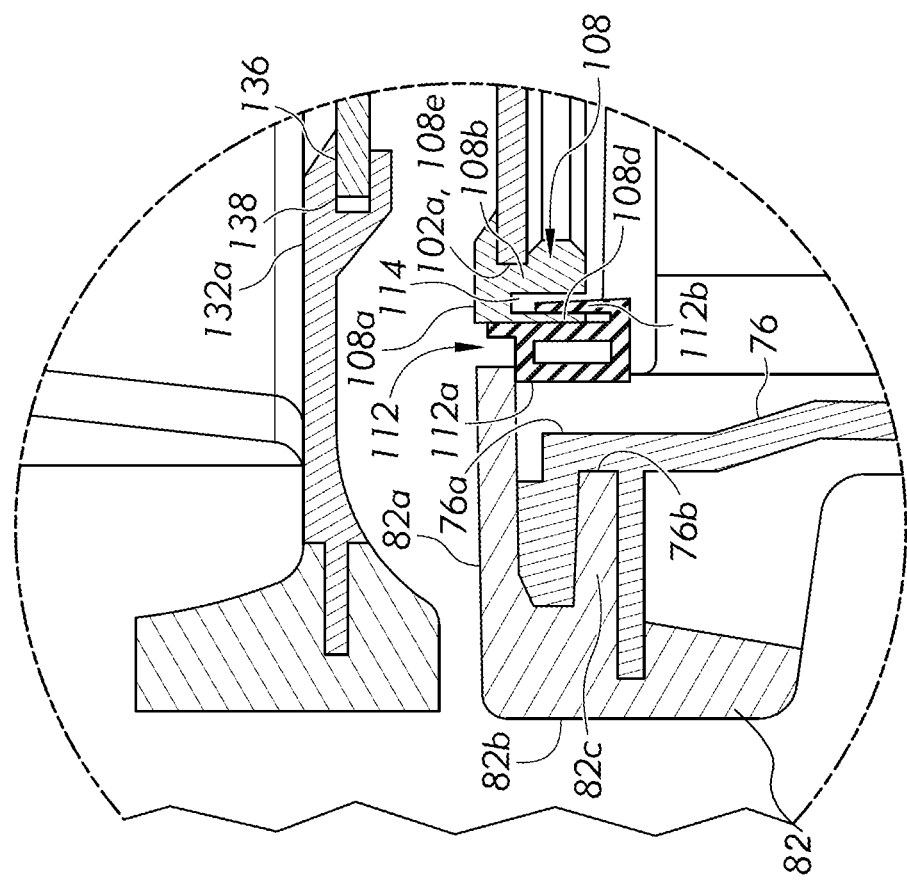
FIG. 7B is a closeup cross-section view of a front portion of the crisper assembly taken along line 7-7 of FIG. 3.

Referring to FIG. 7C, the cover 111 and the rear trim member 110 define a longitudinal void 116 therebetween for accommodating a humidity membrane (not shown) that is removably placed therein. In general, the humidity membrane comprises a paper-based, replaceable item that has a high moisture vapor transmission rate (MVTR) and is preferably hydrophobic (e.g., Tyvek material) that facilitates the removal of moisture and gases from the drawer 70 to the storage compartment 50 when the drawer 70 is in a fully retracted state relative to the lid 100. In particular, one or more openings (not shown) may be formed into a lower surface 110a of the rear trim member 110 for enabling moisture and gases emanating from the drawer 70 to fluidly communicate with the humidity membrane. In a similar manner, one or more openings 111c may be formed in the cover 111 for enabling moisture and gases to escape the drawer 70 when the drawer 70 is in a fully retracted state, as described in detail below.

Still referring to FIG. 7C, a downwardly protruding lug 122 may be formed onto a lower surface 110a of the rear trim member 110. In particular, the lug 122 is sized and positioned to engage recesses 56a (FIG. 8) formed into opposing ledges 56 (FIG. 8) of the storage compartment 50 for fixing the lid 100 to the storage compartment 50, as described in detail below. In the illustrated embodiment, a single, elongated lug 122 protrudes downwardly from the rear trim member 110 along an entire length thereof. Yet, it should be appreciated that the rear trim member 110 may include a pair of lugs (not shown) formed at opposing ends thereof, respectively, for engaging the recesses 56a formed in the ledges 56.

Referring to FIGS. 5 and 7C, a resilient, rear gasket 124 may extend from a lower surface 110a of the rear trim member 110. As shown in FIG. 5, the rear gasket 124 is attached to the rear trim member 110 and is angled forwardly from an upper portion 124a to a lower portion 124b thereof in an unbiased state. As shown in FIG. 7C, when the drawer 70 is in a fully retracted state, it will cause the rear gasket 124 to flex such that the lower portion 124b sealingly engages (FIG. 7C) the rear wall 78 of the drawer 70, as described in greater detail below. Yet, in other examples, it is contemplated that the rear gasket 124 may be angled rearwardly from an upper portion 124a to a lower portion 124b thereof such that the lower portion 124b sealingly engages a rear wall 54 of the storage compartment 50 for sealing the crisper drawer 70.

Figure 6:
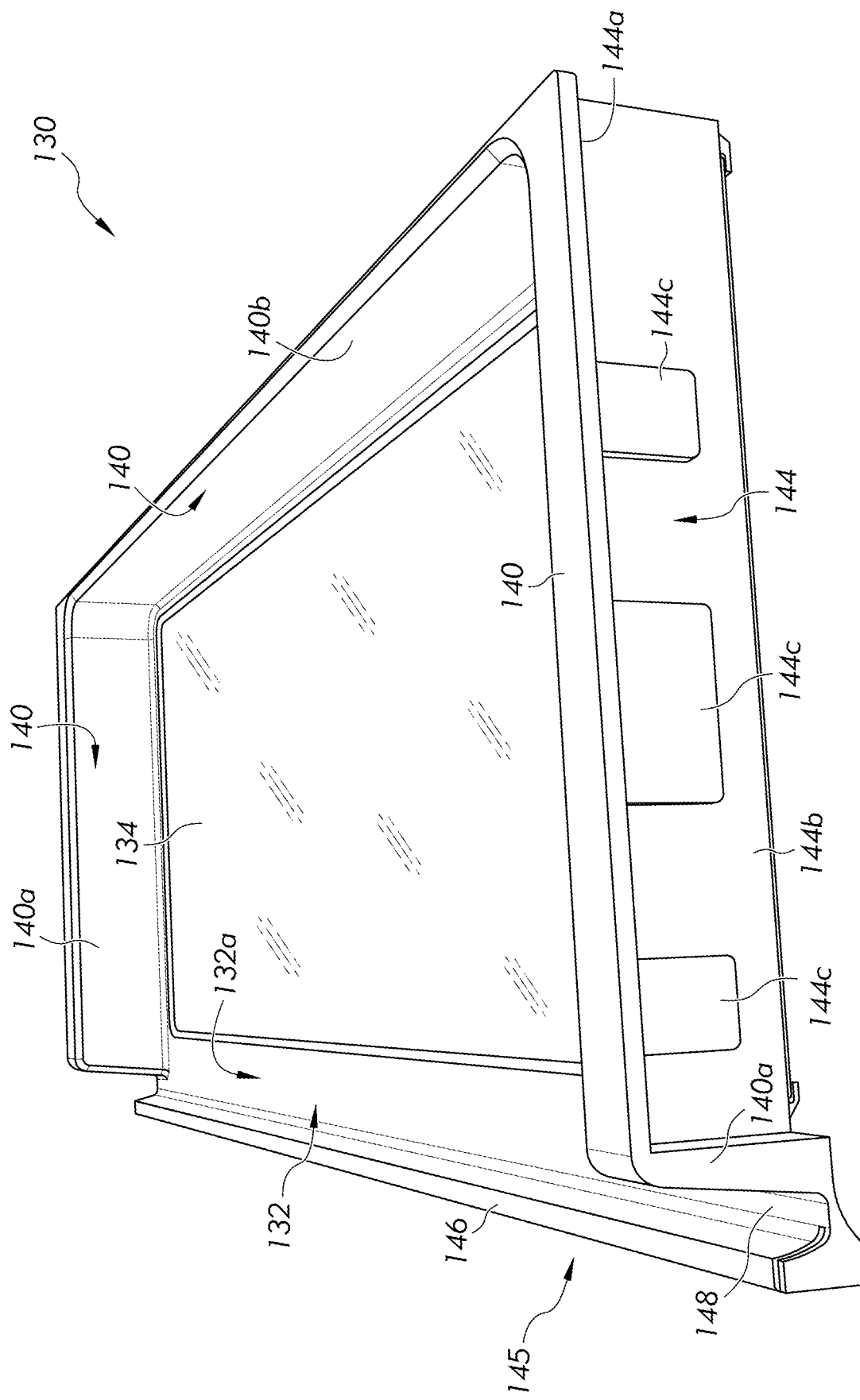
FIG. 6 is a side perspective view of a slide out shelf of the crisper assembly of FIG. 3.

Referring to FIG. 6, an example of the slide out shelf 130 is shown in isolation. In general, the shelf 130 includes a substantially rectangular-shaped frame 132 and a planar panel 134 for storing items on the shelf 130. The frame 132 is preferably made of a plastic material of suitable strength (e.g., ABS, polypropylene, polystyrene, and the like). In the illustrated example, the panel 134 is presented as a transparent glass panel, although alternatively the panel 134 may be made of a transparent plastic material. In further examples, it is also contemplated that the panel 134 may made from an opaque, tinted, or translucent plastic material.

Referring to FIG. 7A, a groove 136 is formed along opposing, inwardly facing sides of the frame 132 for retaining a peripheral edges 138 of the panel 134. In the illustrated example, the panel 134 is recessed relative to an upper surface 132a of the frame 132 to prevent food items (not shown) placed on the panel 134 from sliding off the shelf 130 when the shelf 130 is extended or retracted from or into the storage compartment 50, respectively.

Turning back to FIG. 6, an upwardly extending wall 140 is formed about a periphery of the frame 132. In particular, the upwardly extending wall 140 includes opposing side walls 140a and a rear wall 140b. A recess 144 is formed into an exterior portion of each side wall 140a for accommodating an extendable slide 90 (FIG. 9), as described in detail below. In the shown example, the recess 144 is substantially rectangular-shaped and generally defined by an overhang portion 144a and a vertical wall 144b. A plurality of protrusions 144c are formed depending from the vertical wall 144b, for example at a junction of the overhang portion 144a and the vertical wall 144b and extend downwardly into the recess 144. In the illustrated embodiment, there are three protrusions 144c formed in each recess 144. However, it is contemplated the protrusions 144c may be different in number and form, e.g., may embody a single, elongated protrusion. Functionally, the protrusions 144c are sized and positioned to be received by slots 90c (FIG. 8) formed into an upper surface of a corresponding slide 90 (FIG. 8) for removably mounting the shelf 130 to the storage compartment 50, as discussed in greater detail below.

Still referring to FIG. 6, an elongated handle 145 may be formed about a front portion of the frame 132 for enabling a user to withdraw or retract the shelf 130 from or into the storage compartment 50, respectively. In the illustrated embodiment, the handle 145 extends forwardly and includes an upwardly extending gripping portion 146 that defines a concaved pocket 148 for enabling a user to comfortably grip the gripping portion 146 when extending or retracting the shelf 130. In other examples (not shown), it is contemplated that the handle 145 may optionally be formed without a pocket 148 such that the gripping portion 146 extends upwardly from the upper surface 132a of the frame 132. In further examples, it is contemplated that an aluminum facia may be attached to a front surface (not shown) of the handle 145 to enhance the overall aesthetic appearance of the shelf 130.

Referring back to FIG. 3, the storage compartment 50 is defined by opposing side walls 52 and a rear wall 54. The side walls 52 define a front opening 52b for granting access to the storage compartment 50 in a state wherein the refrigerator door (not shown) is open, e.g., swung open 90° relative to a planar surface of the rear wall 54. While the illustrated embodiment depicts the storage compartment 50 based on a single door arrangement (e.g., a single compartment refrigerator), it should be appreciated that the storage compartment 50 and crisper assembly 60 disclosed herein may be sized and dimensioned to correspond with other refrigerator configurations (e.g., dual French doors, etc.).

In the illustrated embodiment, a portion 52a of each side wall 52 is angled outwardly (see a in FIG. 3) such that the width of the storage compartment 50 located relatively more forwardly than the drawer 70 and the shelf 130 is gradually increased toward the front opening 52b. In this manner, the width of the storage compartment 50 in the vicinity of the front opening 52b is greater than the width of the storage compartment 50 in the vicinity of the drawer 70 and the shelf 130. This configuration is particularly beneficial for enabling the shelf 130 and/or the drawer 70 to be easily withdrawn from the storage compartment 50 without being obstructed by the refrigerator door (not shown) in a state wherein the door is open, and especially in a state where the door is partially but not completely open.

Figure 8:
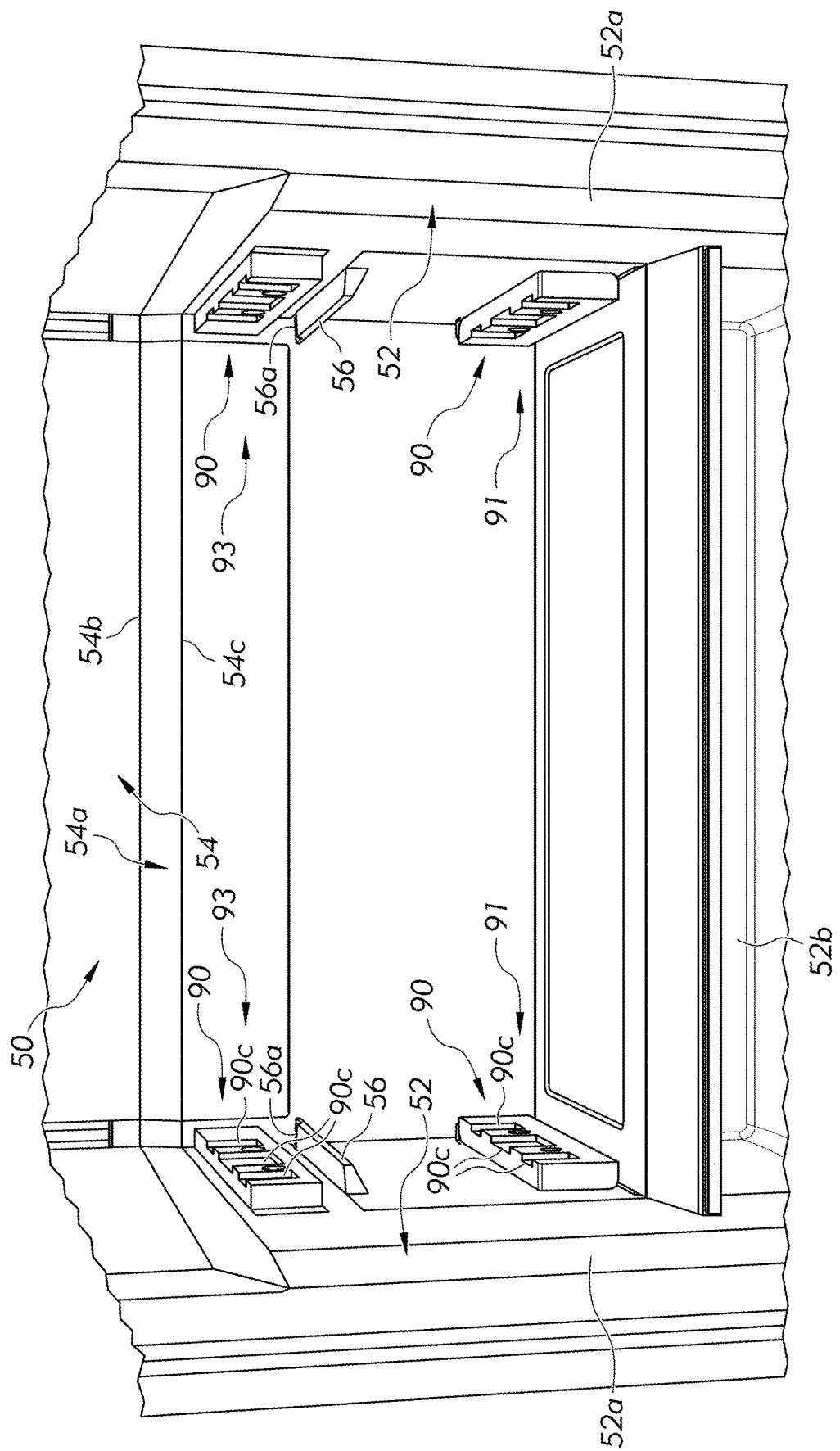
FIG. 8 is an enlarged perspective view of the fresh food storage compartment of FIG. 3 with the crisper assembly removed therefrom.

Referring to FIG. 8, each side wall 52 may also include an inwardly facing ledge 56 that extends longitudinally along a rear portion thereof for supporting a lower surface of the lid 100 (FIG. 5). More specifically, each ledge 56 is sized and dimensioned to accommodate a lower surface of a corresponding side member 106 (FIG. 5) of the lid 100. A recess 56a may be formed into a rear portion of each ledge 56 for receiving the lug 122 (FIG. 5) formed onto the lower surface of the rear trim member 110, as described in detail below.

Still referring to FIG. 8, an angled portion 54a may be formed in the rear wall 54 liner of the storage compartment 50 and extend longitudinally between the opposing side walls 52. In the illustrated embodiment, the angled portion 54a is inclined forwardly (e.g., toward a center of the storage compartment 50) from an upper end 54b to a lower end 54c thereof. In particular, the lower end 54c of the angled portion 54a is substantially contiguous with an upper edge of the upwardly extending wall 140 (FIG. 3) of the shelf 130 to make the storage compartment 50 aesthetically more pleasing in fit and finish, especially to line up with the depth of the drawer 70 and shelf 130 located within the compartment. However, it is also contemplated that the rear wall 54 of the storage compartment 50 may alternatively be formed as a generally flat, planar rear wall.

Figure 9:
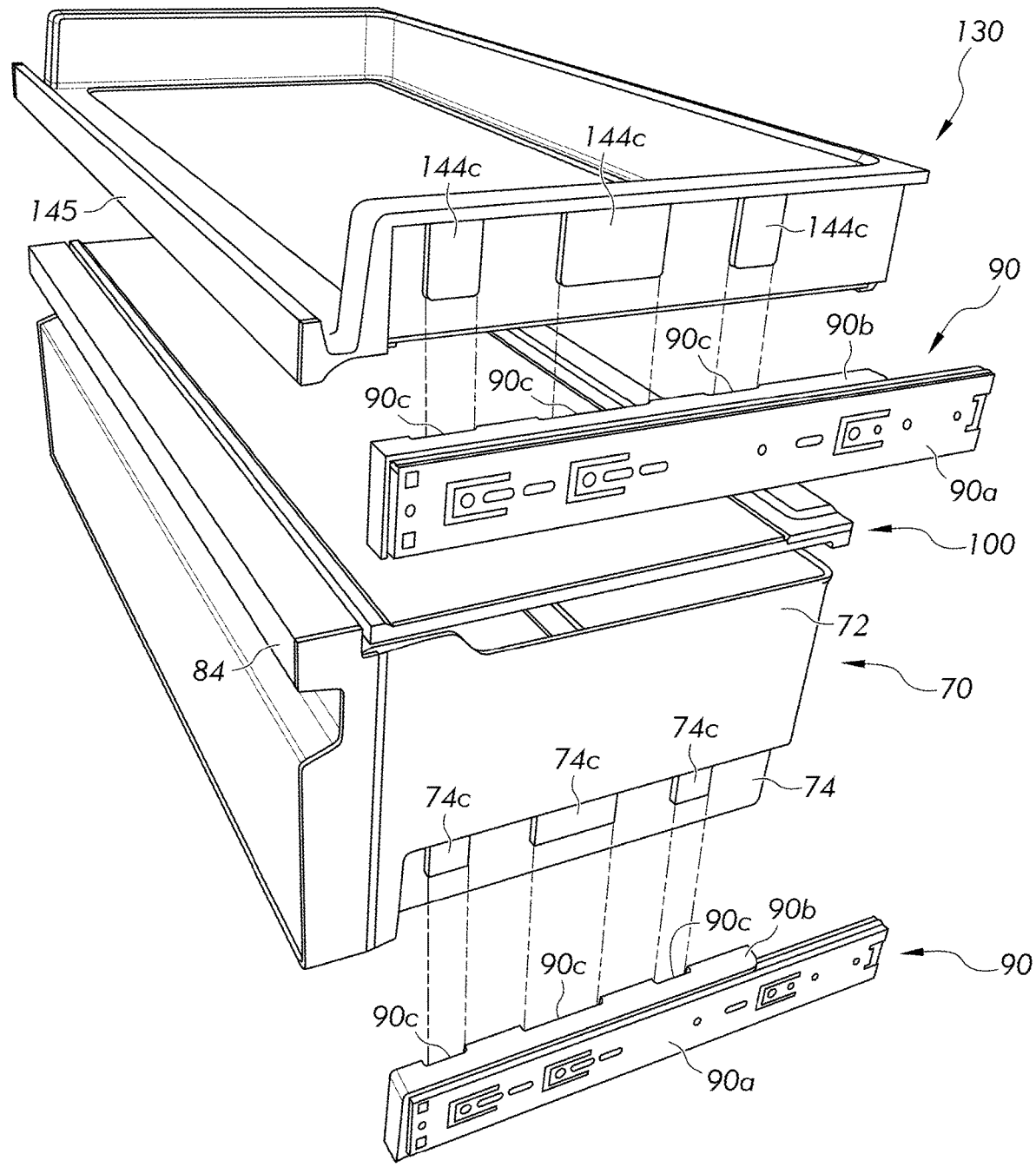
FIG. 9 is an exploded perspective view of the crisper assembly of FIG. 3 in relation to extension slides of the fresh food storage compartment of FIG. 3.

Referring to FIGS. 8 and 9, a plurality of the extendable linear slides 90 may be secured to the opposing side walls 52 of the storage compartment 50 for removably mounting the drawer 70 and the shelf 130 thereto, as described in detail below. As shown in FIG. 9, each slide 90 includes a fixed portion 90a and a slidable portion 90b. It is contemplated that the slides 90 may be secured to the side walls 52 by attaching the fixed portions 90a to the side walls 52 with removable fasteners (e.g., screws, nuts, bolts, and the like).

When the slides 90 are secured to the side walls 52, the slidable portion 90b of each slide 90 may slide forwards relative to the fixed portion 90a. In some examples, it is contemplated that the slides 90 may utilize ball-bearings or similar structure for providing a reduced friction interface between the slidable portion 90b and the fixed portion 90a.

Referring to FIGS. 7A, 8, and 9, a description of mounting the lid 100, the drawer 70, and the shelf 130 to the storage compartment 50 will now be described in detail. As shown in FIG. 7A, the lid 100 may be mounted to the storage compartment 50 by placing the lid 100 onto each ledge 56 and pushing the lid 100 backward until the lug 122 formed on the rear trim member 110 drops into a recess 56a (see also FIG. 8) formed into a corresponding ledge 56. In this manner, the cooperation between the lug 122 and each recess 56a restrains the lid 100 from being pulled forward such that the lid 100 remains stationary relative to the drawer 70 and/or the shelf 130 when the drawer 70 and/or the shelf 130 are extended forward by a user, as described in detail below.

Referring to FIGS. 8 and 9, the drawer 70 may be mounted to the storage compartment 50 by positioning the drawer 70 over a lower pair 91 (FIG. 8) of slides 90 such that the protrusions 74c (FIG. 9) formed in the recesses 74 of the drawer 70 are aligned with the slots 90c formed in the lower pair 91 of slides 90. When aligned this way, the protrusions 74c may be extended or dropped into the slots 90c for mounting the drawer 70 to the lower pair 91 of slides 90. In this configuration, the protrusions 74c and the slots 90c will interlock with each other such that the slidable portion 90b of each slide 90 may move forward relative to the fixed portion 90a when a user pulls on the handle 84 of the drawer 70 to extend the drawer 70 forward. Additionally, the drawer 70 may be removed from the storage compartment 50 by pulling the drawer 70 forward to an extended position, and lifting the drawer 70 upwards (e.g., via the side walls 72) such that the protrusions 74c disengage the slots 90c formed in each slide 90.

Still referring to FIGS. 8 and 9, the shelf 130 may be mounted to and/or removed from the storage compartment 50 in a substantially similar way to that just described for the drawer 70, except for the differences noted below. In particular, the shelf 130 may be positioned above an upper pair 93 (FIG. 8) of slides 90 such that the protrusions 144c (FIG. 9) formed in the recesses 144 of the shelf 130 are aligned with the slots 90c formed in the upper pair 93 (FIG. 9) of slides 90. When aligned this way, the protrusions 144c may be extended or dropped into the slots 90c for mounting the shelf 130 to the upper pair 93 of slides 90. In this manner, when a user pulls on the handle 145 of the shelf 130 to extend the shelf 130 forward, the slidable portion 90b of each slide 90 will move forward relative to fixed portion 90a. Moreover, the shelf may be removed from the storage compartment 50 by pulling the shelf 130 forward to an extended position, and lifting the shelf 130 upwards such that the protrusions 144c disengage the slots 90c formed in each slide 90.

By dimensioning the protrusions 74c and 144c to correspond with the slots 90c in each slide 90, it is possible to provide a modular storage compartment design capable of receiving interchangeable components to effectively reduce the cost of manufacturing. Moreover, these features also enable the shelf 130, the drawer 70, and any corresponding examples described herein to be easily removed from the storage compartment 50, such as, for example, when a user desires to clean or sanitize the shelf 130 and/or the drawer 70.

Referring to FIGS. 7A-7C, the crisper assembly 60 will new be described with respect to the functionality of the same. Referring to FIG. 7A, when the drawer 70 is in a fully retracted state, the drawer 70 will be sealed from the ambient air of the storage compartment 50. As shown in FIG. 7B, the abutment portion 112a of the front gasket 112 will engage the front trim member 82 of the drawer 70, and the lower portion 124b of the rear gasket 124 will engage the rear wall 78 of the drawer 70 to seal the front and rear sides of the drawer 70, respectively. Although, in alternative embodiments, it is contemplated that the abutment portion 112a of the front gasket 112 may engage the front wall 76 of the drawer 70, and the lower portion 124b of the rear gasket 124 may engage the rear wall 54 of the storage compartment 50 for sealing the respective front and rear sides of the drawer 70. Additionally, when the lid 100 is seated on the ledges 56 of the storage compartment 50, each side member 106 of the lid 100 will abut a corresponding side wall 52 of the storage compartment 50 to seal the sides of the drawer 70. Referring to FIG. 7C, when the drawer 70 is sealed in this manner, moisture or gases (e.g., condensation, ethylene gas) emitted from food items (e.g., fruits and vegetables) placed in the drawer 70 will be forced to exit the drawer 70 through the one or more openings (not shown) formed into the lower surface 110a of the rear trim member 110. Accordingly, moisture or gases exiting the drawer 70 will be forced to fluidly communicate with the humidity membrane (not shown) disposed in the void 116 before exiting the drawer 70 through the opening 111c formed in the cover 111. In this manner, the humidity membrane may facilitate the removal of moisture and/or gases from the drawer 70 to preserve the edible life and freshness of the food items placed therein. Additionally, and in such examples wherein the cartridge 98 (FIG. 7A) disposed on the rear wall 78 of the drawer 70 is an ethylene absorber cartridge, the cartridge 98 will absorb residual ethylene gas in the drawer 70 to further enhance the freshness of the food items stored in the drawer 70.

Figure 10A:
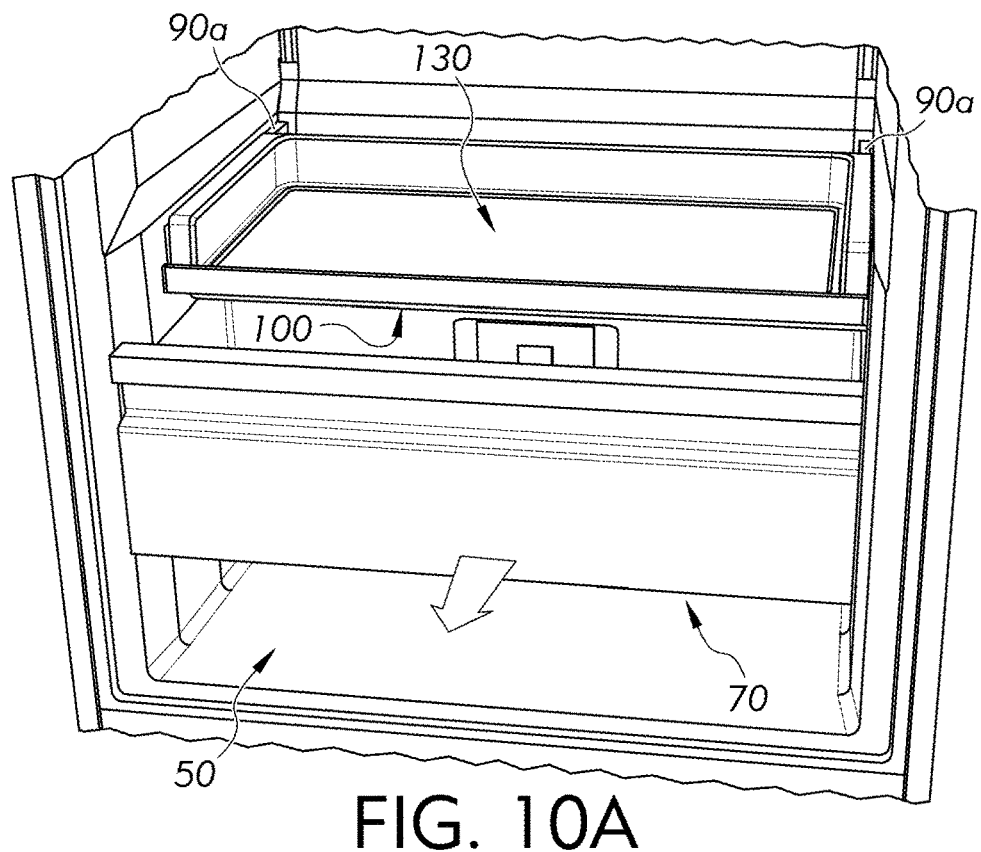
FIG. 10A is an enlarged perspective view of the fresh food storage compartment of FIG. 3 with the crisper drawer in a partially extended state.
Figure 10B:
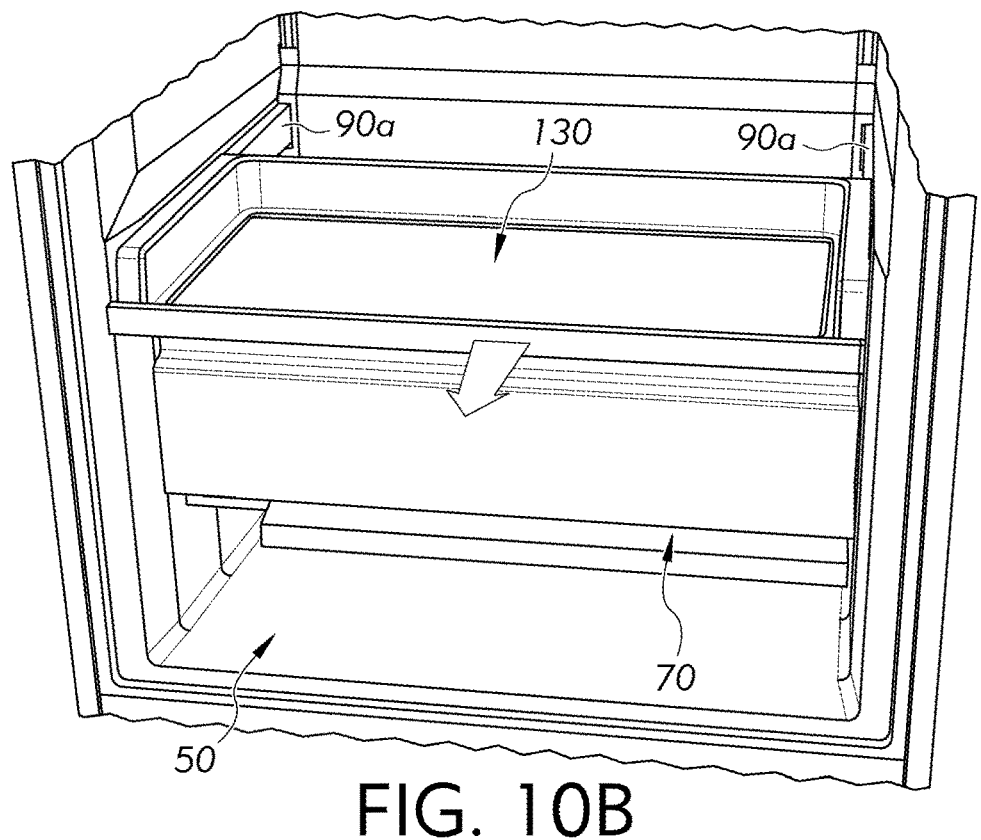
FIG. 10B is an enlarged perspective view of the fresh food storage compartment of FIG. 3 with the crisper shelf in a partially extended state.

Referring to FIGS. 10A and 10B, since the drawer 70, the lid 100, and the shelf 130 are each independently mounted to the storage compartment 50 as described above, the sealing function of the lid 100, which remains stationary therewith, is unaffected by the extension or retraction of the shelf 130 (FIG. 10B). Furthermore, enabling the shelf 130 to be independently extended or retracted with respect to the drawer 70 improves the ergonomic design of the refrigerator, particularly since a user may extend the shelf 130 outwards to more easily remove or place food items from or onto the shelf 130, respectively. Conversely, and since the drawer 70 (FIG. 10A) is independently mounted to the storage compartment 50, a user may extend the drawer 70 without affecting the stability of food items placed on the shelf 130. Moreover, the stacked arrangement of the drawer 70 with respect to the shelf 130 increases the space utilization of the storage compartment 50, thereby enabling a user to place more food items or accessory items into the storage compartment 50.

The invention has been described with reference to the example embodiments described above. Modifications and alterations will occur to others upon a reading and understanding of this specification. For instance, the crisper assemblies described herein may be adapted for placement in different refrigerator configurations (e.g., French-door, Top mount, Bottom mount). It is also contemplated that the crisper assemblies may be modified such that two or more crisper assemblies may be placed in a side-by-side arrangement relative to each other. Example embodiments incorporating one or more aspects of the invention are intended to include all such modifications and alterations insofar as they come within the scope of the appended claims and their equivalents.

What is claimed is:

1. A refrigerator comprising:
    a storage compartment, wherein the storage compartment includes an opening, opposing side walls, and a rear wall;
    a drawer slidably mounted to the storage compartment and configured to slide between an extended position and a retracted position;
    a shelf positioned above the drawer and in a stacked arrangement therewith, wherein the shelf is slidably mounted to the storage compartment independently of the drawer and is configured to slide between an extended position and a retracted position independently of the drawer; and
    a lid interposed between the drawer and the shelf and fixed to the storage compartment such that the lid remains stationary therewith, and wherein the lid is configured to cover the drawer when the drawer is in the retracted position in the storage compartment,
    wherein a portion of each side wall of the storage compartment is inclined outwardly such that a width of the storage compartment proximate the opening is greater than the width of the storage compartment proximate the drawer and the shelf.

2. The refrigerator according to claim 1, wherein each side wall of the storage compartment includes a first slide that is configured to removably mount the drawer to the storage compartment, and a second slide that is configured to removably mount the shelf to the storage compartment.

3. The refrigerator according to claim 2, wherein the lid further comprises a lug disposed on a lower surface of the lid, and wherein each side wall includes a ledge defining a recess that is configured to engage the lug disposed on the lower surface of the lid to fix the lid to the storage compartment.

4. The refrigerator according to claim 3, wherein the lid further comprises:
    a panel and a frame,
    wherein the frame comprises a front trim member, a rear trim member, and opposing side members, and
    wherein each side member is supported by a respective ledge and is configured to seal a respective side portion of the drawer when the drawer is in the retracted position.

5. The refrigerator according to claim 4, wherein a first gasket is disposed on the front trim member, and a second gasket is disposed on the rear trim member, wherein the first gasket and the second gasket are configured to seal front and rear portions, respectively, of the drawer when the drawer is in the retracted position.

6. The refrigerator according to claim 4, wherein a cover is removably attached to the rear trim member of the lid to define a void therebetween, and wherein a humidity membrane is placed in the void to enable moisture and gases to exit the drawer when the drawer is in the retracted position.

7. The refrigerator according to claim 2, wherein the drawer further comprises:
    opposing side walls, a front wall, and a rear wall, wherein a recess is formed in an exterior portion of each side wall of the drawer, and wherein the recess includes a protrusion that is dimensioned to be received by a slot formed in each first slide to thereby removably mount the drawer to the storage compartment.

8. The refrigerator according to claim 7, wherein the drawer further comprises an ethylene absorber cartridge that is disposed on one of the rear wall, the front wall, or the side walls of the drawer and is configured to absorb ethylene gas emitted from food items placed in the drawer.

9. The refrigerator according to claim 7, wherein a handle is provided on the front wall of the drawer, and wherein the handle is operable to move the drawer between the extended position and the retracted position.

10. The refrigerator according to claim 1, wherein the shelf further comprises:
a panel and a frame, and wherein the panel is recessed relative to an upper surface of the frame.

11. The refrigerator according to claim 10, wherein the shelf further comprises:
a handle formed about a front portion of the shelf, and wherein the handle is operable to extend or retract the shelf between the extended position and the retracted position.

12. The refrigerator according to claim 10, wherein the shelf further comprises an upwardly extending wall formed about a periphery of the frame.

13. The refrigerator according to claim 12, wherein the upwardly extending wall of the shelf further comprises opposing side walls and a rear wall, wherein a recess is formed in an exterior portion of each side wall of the shelf, and wherein the recess of each side wall of the shelf includes a protrusion that is received by a slot formed in a slide to removably mount the shelf to the storage compartment.

14. A crisper assembly for a refrigerator storage compartment, comprising:
a drawer configured to slide between an extended position and a retracted position;
a shelf positioned above the drawer and in a stacked arrangement therewith, wherein the shelf is independent of the drawer and is configured to slide between an extended position and a retracted position; and
a lid interposed between the drawer and the shelf, wherein the lid is fixed relative to both of the drawer and shelf and is configured to cover the drawer when the drawer is in the retracted position, wherein the lid comprises:
a panel,
a frame,
a cover removably attached to the frame to define a void therebetween, and
a humidity membrane is placed in the void to enable moisture and gases to exit the drawer when the drawer is in the retracted position.

15. The crisper assembly according to claim 14, wherein the drawer is defined by opposing side walls and a rear wall, and wherein each side wall of the drawer includes a protrusion to removably mount the drawer to said storage compartment.

16. The crisper assembly according to claim 14, wherein the shelf comprises a frame and a panel, wherein a plurality of side walls are formed about the frame of the shelf, and wherein two of the plurality of side walls includes a protrusion to removably mount the shelf to the storage compartment.

17. The crisper assembly according claim 14, wherein the lid further comprises a front gasket and a rear gasket, wherein the front gasket and the rear gasket are configured to seal front and rear portions, respectively, of the drawer when the drawer is in the retracted position.

18. The crisper assembly according to claim 14, wherein an ethylene absorber cartridge is provided in the drawer and is configured to absorb ethylene gas from food items placed in the drawer.

19. The refrigerator according to claim 1, wherein each side wall of the storage compartment includes a first extendable slide that is configured to removably mount the drawer to the storage compartment.

20. A refrigerator comprising: a storage compartment, wherein the storage compartment includes an opening, opposing side walls, and a rear wall; a drawer slidably mounted to the storage compartment and configured to slide between an extended position and a retracted position; a shelf positioned above the drawer and in a stacked arrangement therewith, wherein the shelf is slidably mounted to the storage compartment independently of the drawer and is configured to slide between an extended position and a retracted position independently of the drawer; and a lid interposed between the drawer and the shelf and fixed to the storage compartment such that the lid remains stationary therewith, and wherein the lid is configured to cover the drawer when the drawer is in the retracted position in the storage compartment, wherein the lid comprises a lug disposed on a lower surface of the lid, and wherein each side wall of the storage compartment includes a ledge defining a recess that is configured to engage the lug disposed on the lower surface of the lid to fix the lid to the storage compartment.

* * * * *